(12) United States Patent
Yang et al.

(10) Patent No.: US 11,059,542 B2
(45) Date of Patent: Jul. 13, 2021

(54) BICYCLE DERAILLEUR

(71) Applicant: Sun Race Sturmey-Archer Inc., Taoyuan (TW)

(72) Inventors: Chang-Yao Yang, New Taipei (TW); Chien-Chih Chang, Changhua (TW)

(73) Assignee: SUN RACE STURMEY-ARCHER INC., Taoyuan (TW)

( * ) Notice: Subject to any disclaimer, the term of this patent is extended or adjusted under 35 U.S.C. 154(b) by 479 days.

(21) Appl. No.: 16/058,029

(22) Filed: Aug. 8, 2018

(65) Prior Publication Data

US 2019/0047660 A1 Feb. 14, 2019

(30) Foreign Application Priority Data

Aug. 10, 2017 (TW) .................................. 106127154

(51) Int. Cl.
| | | |
|---|---|---|
| *B62M 9/124* | (2010.01) | |
| *B62M 9/1248* | (2010.01) | |
| *B62M 9/121* | (2010.01) | |
| *B62M 9/126* | (2010.01) | |

(52) U.S. Cl.
CPC ............ *B62M 9/124* (2013.01); *B62M 9/121* (2013.01); *B62M 9/1248* (2013.01); *B62M 9/126* (2013.01); *B62M 2009/12406* (2013.01)

(58) Field of Classification Search
CPC ...... B62M 9/121; B62M 9/124; B62M 9/126; B62M 2009/12406; B62M 2009/12413; B62M 9/1242; B62M 9/1244; B62M 9/1246; B62M 9/1248; B62M 9/131; B62M 9/134; B62M 9/1342; B62M 9/1344; B62M 9/1348
See application file for complete search history.

(56) References Cited

U.S. PATENT DOCUMENTS

| | | | | |
|---|---|---|---|---|
| 2012/0083371 A1* | 4/2012 | Yamaguchi | ............ | B62M 9/126 474/80 |
| 2012/0083372 A1* | 4/2012 | Yamaguchi | ............ | B62M 9/126 474/80 |
| 2013/0288834 A1* | 10/2013 | Yamaguchi | .......... | B62M 9/1244 474/80 |

(Continued)

*Primary Examiner* — Michael R Mansen
*Assistant Examiner* — Raveen J Dias
(74) *Attorney, Agent, or Firm* — Locke Lord LLP; Tim Tingkang Xia, Esq.

(57) ABSTRACT

A bicycle derailleur includes a lower link member including a position-limiting structure, an external chain-guiding member, a damping shaft, a connection member and a C-shape spring. The external chain-guiding member, connected pivotally with the lower link member, controls a tension of a chain. The connection member is connected with the lower link member. The damping shaft, mounted at one side of the lower link member, is connected pivotally with the external chain-guiding member. The C-shape spring, sleeving the damping shaft, includes a C-clip portion and a first plate portion disposed between the connection member and the position-limiting structure. The first plate portion is extended outward from one end of the C-clip portion in a direction leaving the damping shaft. A friction force upon the external chain-guiding member in the direction to relax the chain is greater than that in the direction to relax the chain.

3 Claims, 9 Drawing Sheets

(56) References Cited

U.S. PATENT DOCUMENTS

| | | | | |
|---|---|---|---|---|
| 2013/0310204 A1* | 11/2013 | Shahana | ................ | B62M 9/121 |
| | | | | 474/80 |
| 2014/0162817 A1* | 6/2014 | Yamaguchi | ............ | B62M 9/122 |
| | | | | 474/80 |
| 2015/0031483 A1* | 1/2015 | Yamaguchi | ............ | B62M 9/126 |
| | | | | 474/80 |
| 2016/0046352 A1* | 2/2016 | Shipman | ................ | B62M 9/126 |
| | | | | 474/80 |
| 2020/0130779 A1* | 4/2020 | Ma | ....................... | B62M 9/1248 |

* cited by examiner

BICYCLE DERAILLEUR

CROSS REFERENCE TO RELATED APPLICATION

This application claims the benefit of Taiwan Patent Application Serial No. 106127154, filed on Aug. 10, 2017, the subject matter of which is incorporated herein by reference.

BACKGROUND OF THE INVENTION

(1) Field of the Invention

The invention relates to a transmission apparatus for a bicycle, and more particularly to a bicycle derailleur that can provide different resistance in two directions of rotation.

(2) Description of the Prior Art

Recently, cycling (i.e., bicycle riding) has become one of popular competitive sports. To meet different applications of bicycles in entertainments, communications and competitions, various improvements upon parts or supplies for bicycles are kept introducing into the marketplaces. Taiwan, as one of major countries to manufacture bicycles, is well known and has a reputation in the world in supplying high-quality bicycles. Generally, a high-quality bicycle is usually featured in complicated structuring. For example, a transmission device of a typical high-quality bicycle may include plural front chain sprockets and plural rear chain sprockets. In particular, the front sprockets are usually coaxially and integrally assembled so as to be rotated simultaneously by a pair of pedals. On the other hand, the rear sprockets are also coaxially and integrally assembled to a rear axle so as to be rotated simultaneously by a rear wheel.

Nevertheless, during bicycle riding, while in meeting an event of impact or shaking upon the wheels caused by an uneven road surface, an external chain-guiding member of the bicycle would oscillate with respect to the road surface, and the corresponding oscillatory amplitude would be proportional to the impact force. Thereupon, a problem of chain slack would be induced.

SUMMARY OF THE INVENTION

Accordingly, it is an object of the present invention to provide a bicycle derailleur that includes an external chain-guiding member to provide different rotational friction forces in two different directions of rotation with respect to a lower link member, so that respective slack and tense rotation states corresponding different directions of rotation can be obtained.

It is another object of the present invention to provide a bicycle derailleur that the external chain-guiding member in a direction to relax the chain can provide a tenser rotation state, such that the external chain-guiding member can control effectively tension of the chain so as not to relax the chain. Thereupon, the conventional slack problem of the chain upon meeting the event of impact or shaking can be substantially lessened.

It is a further object of the present invention to provide a bicycle derailleur that is furnished with a switch shaft to control operations of the external chain-guiding member between two different directions of rotation for determine slack or tense rotation states of the chain.

In the present invention, the bicycle derailleur includes a lower link member, an external chain-guiding member, a damping shaft, a connection member and a C-shape spring. The lower link member includes a position-limiting structure. The external chain-guiding member, connected pivotally with the lower link member, is to control a tension of a chain, and able to rotate about the lower link member in one of a direction to tense the chain and another direction to relax the chain opposing the direction to tense the chain. The damping shaft, mounted at one side of the lower link member, is connected pivotally with the external chain-guiding member. The connection member is connected with the lower link member. The C-shape spring, being mounted at the side of the lower link member and sleeving the damping shaft, includes a C-clip portion and a first plate portion. The first plate portion is disposed between the connection member and the position-limiting structure. The C-clip portion contacts the damping shaft to form a first tense relationship. The first plate portion is extended outward from one end of the C-clip portion in a direction leaving the damping shaft. When the external chain-guiding member rotates about the lower link member in the direction to relax the chain, the external chain-guiding member rotates the damping shaft to contact the C-clip portion, and the C-clip portion further moves the first plate portion restrained by the connection member and the position-limiting structure, such that a first friction force in the direction to relax the chain is generated between the damping shaft and the C-clip portion, and the first friction force makes the C-clip portion tighten the damping shaft so as to enhance the first tense relationship. When the external chain-guiding member rotates about the lower link member in the direction to tense the chain, the external chain-guiding member rotates the damping shaft to contact the C-clip portion so as to generate a second friction force in the direction to tense the chain between the damping shaft and the C-clip portion, and the second friction force relaxes the C-clip portion from the damping shaft so as to weaken the first tense relationship. Wherein the first friction force is greater than the second friction force.

In one embodiment of the present invention, the C-shape spring further includes a second plate portion extended outward from another end of the C-clip portion in another direction leaving the damping shaft.

In one embodiment of the present invention, the bicycle derailleur further includes a switch shaft. The switch shaft contains the connection member. The switch shaft, pivotally connected with the lower link member, is located between the first plate portion and the second plate portion. The switch shaft is turned to define the C-shape spring an active state and an inactive state with respect to the damping shaft. When the C-shape spring is in the active state, the C-clip portion contacts the damping shaft to form the first tense relationship. When the C-shape spring is in the inactive state, the C-clip portion does not contact the damping shaft so as to lift the first tense relationship.

In one embodiment of the present invention, when the C-shape spring is in the inactive state with respect to the damping shaft, the C-clip portion contacts partly the damping shaft to form a second tense relationship, and tightening forcing provided by the C-clip portion under the second tense relationship is smaller than that under the first tense relationship.

In one embodiment of the present invention, the switch shaft includes a plurality of flanges. When any of the plurality of flanges does not contact the first plate portion and the second plate portion, the second plate portion kept separately from the first plate portion by originally preset spacing is co-moved with the C-clip portion, and so the C-clip portion moves to contact the damping shaft, such that the C-shape spring is in the active state with respect to the damping shaft. When each of the plurality of flanges contacts respectively the first plate portion and the second plate portion, the second plate portion is kept away from the first plate portion further so as to expand the C-clip portion, and so the C-clip portion moves to be free of contact with the damping shaft, such that the C-shape spring is in the inactive state with respect to the damping shaft.

In one embodiment of the present invention, the bicycle derailleur further includes a lower shaft connected in between with the damping shaft and the external chain-guiding member.

In one embodiment of the present invention, the bicycle derailleur further includes a switch-shaft control member connecting the switch shaft.

As stated, in the bicycle derailleur provided by the present invention, the rotational friction force of the external chain-guiding member in the direction to relax the chain can be controlled to be greater than that in the direction to tense the chain, and thus the rotation of the external chain-guiding member 10 in the direction to relax the chain would present a tenser state. Thereupon, the tension of the chain can be controlled to a degree without relaxing the chain. Hence, the chain-slack problem of the bicycle caused by impacts and/or shaking can be substantially lessened.

All these objects are achieved by the bicycle derailleur described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a bicycle derailleur. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
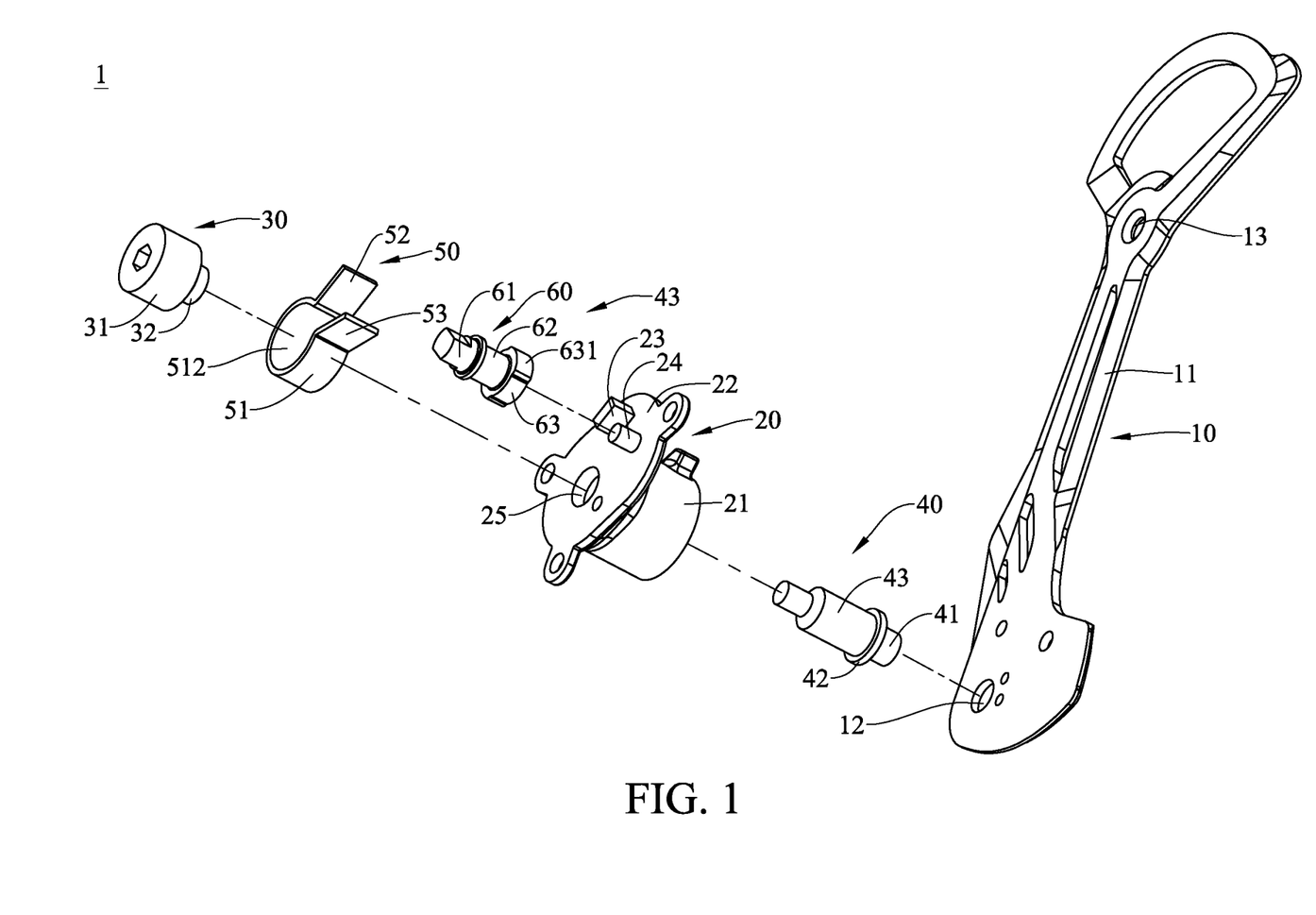
FIG. 1 is a schematic exploded view of a preferred bicycle derailleur in accordance with the present invention.
Figure 2A:
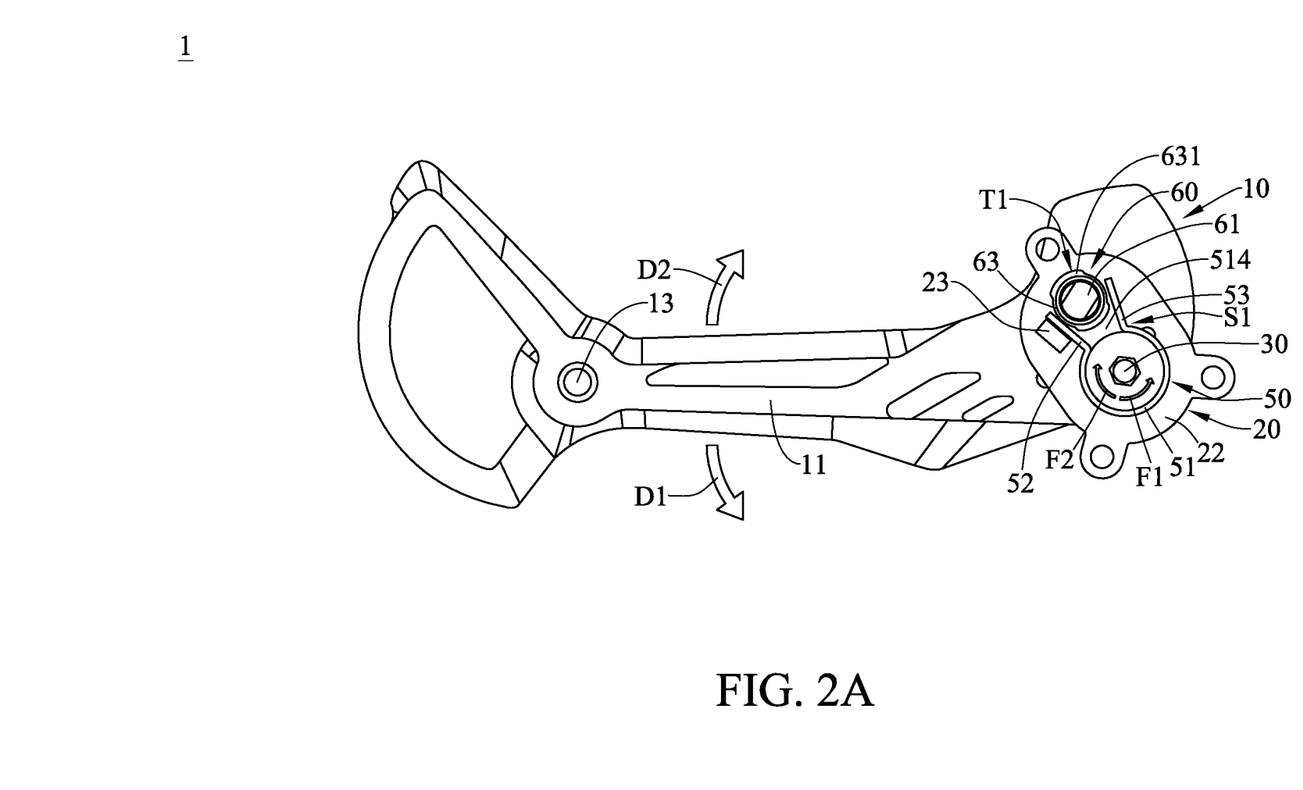
FIG. 2A shows schematically an active state of the bicycle derailleur of FIG. 1.
Figure 2B:
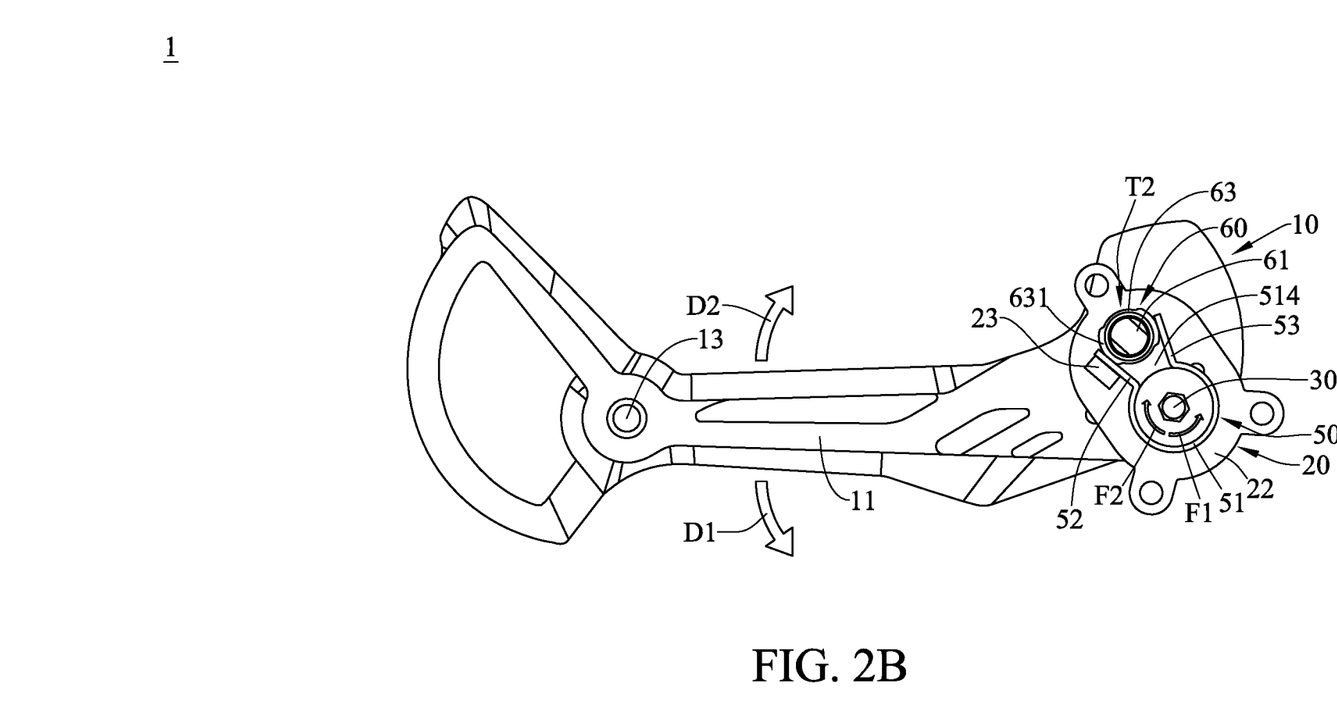
FIG. 2B shows schematically an inactive state of the bicycle derailleur of FIG. 1.
Figure 3A:
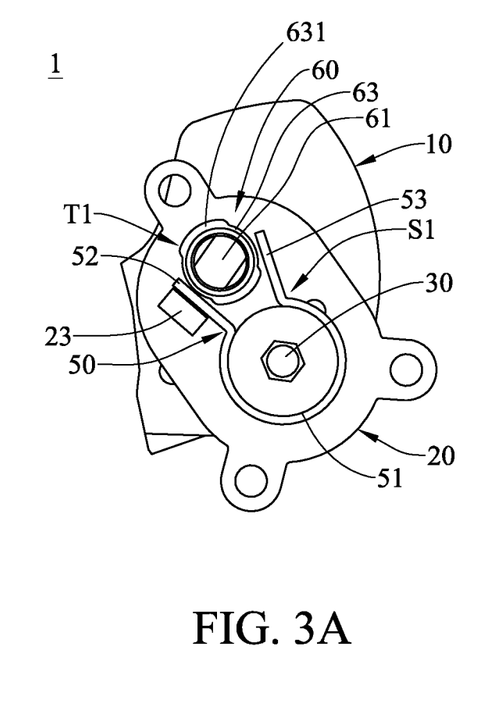
FIG. 3A demonstrates schematically and enlarged view of a portion of FIG. 2A.
Figure 3B:
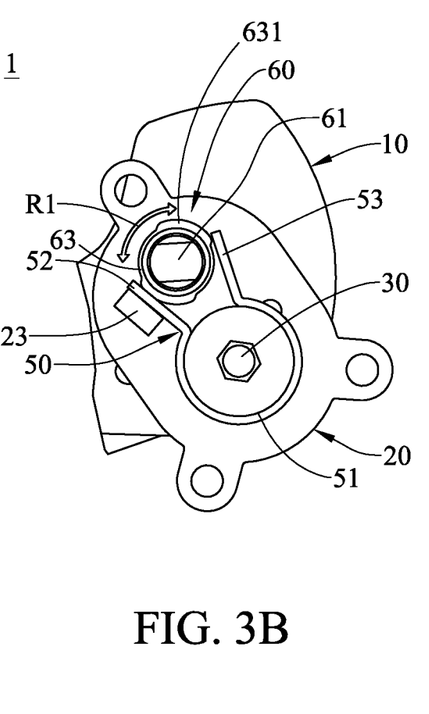
FIG. 3B is another state of FIG. 3A with the switch shaft on a switching stage.
Figure 3C:
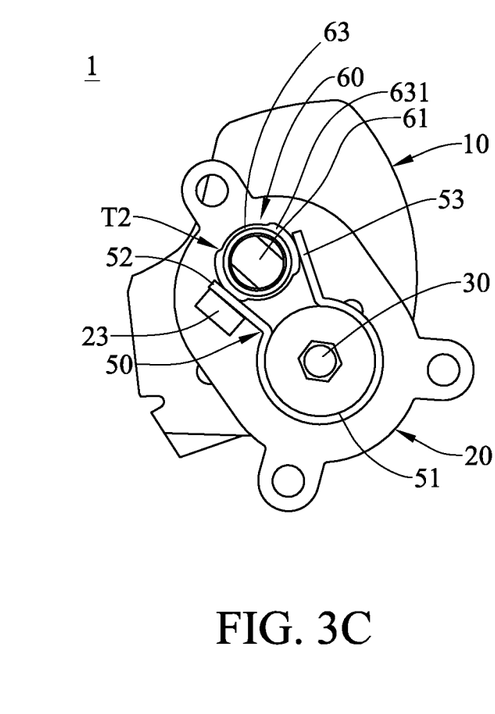
FIG. 3C is a further state of FIG. 3B with the switch shaft on a further switching stage.

Refer now to FIG. 1 through FIG. 3C; where FIG. 1 is a schematic exploded view of a preferred bicycle derailleur in accordance with the present invention, FIG. 2A shows schematically an active state of the bicycle derailleur of FIG. 1, FIG. 2B shows schematically an inactive state of the bicycle derailleur of FIG. 1, FIG. 3A demonstrates schematically and enlarged view of a portion of FIG. 2A, FIG. 3B is another state of FIG. 3A with the switch shaft on a switching stage, and FIG. 3C is a further state of FIG. 3B with the switch shaft on a further switching stage. It shall be explained firstly that, from FIG. 1 to FIG. 3C, some parts of a linkage assembly, including at least an upper link bar, a right link bar and a left link bar, and lower guide sprockets are omitted in order to make descriptions of the present invention concisely.

Referring now to FIG. 1 and FIG. 2A, in this embodiment, the bicycle derailleur 1 includes an external chain-guiding member 10, a lower link member 20, a damping shaft 30, a lower shaft 40, a C-shape spring 50 and a switch shaft 60.

In this embodiment, the external chain-guiding member 10 includes a chain-guiding bracket 11, a first pivotal hole 12 and a second pivotal hole 13. The external chain-guiding member 10 connects the lower guide sprockets via the second pivotal hole 13, and the lower guide sprockets 70 are to connect the chain. Thereupon, the external chain-guiding member 10, capable of controlling tension of the chain, is connected pivotally with the lower link member 20, as shown in FIG. 2A. With respect to the lower link member 20, the external chain-guiding member 10 can rotate in a direction D2 to tighten or tense the chain or a reverse direction D1 to relax the chain D1. As shown, the direction D2 is a clockwise direction, while the direction D1 is a counter clockwise direction.

In this embodiment, the lower link member 20 includes a main axle body 21, a disc body 22, a position-limiting structure 23, a pivotal shaft 24 and a mounting hole 25. The main axle body 21 is a cylindrical hollow element. The disc body 22, as a plate body, is connected to one side of the main axle body 21. The position-limiting structure 23, constructed on the disc body 22 opposing the main axle body 21, can be shaped as a protrusive block with a rectangular cross section. The pivotal shaft 24, constructed also on the disc body 22 at the same side having the position-limiting structure 23 and spaced from the position-limiting structure 23 by a predetermined distance, can be shaped as a pillar. The mounting hole 25 is a hole on the disc body 22 and communicative spatially with a hollow space inside the main axle body 21.

The external chain-guiding member 10 connects pivotally with the damping shaft 30, with the damping shaft 30 located at one side of the lower link member 20. The damping shaft 30 includes a shaft body 31 and a pivotal connection portion 32. The pivotal connection portion 32 connects one end of the shaft body 31. Both the shaft body 31 and the pivotal connection portion 32 can be cylindrical, with a diameter of the pivotal connection portion 32 being smaller than that of the shaft body 31. The pivotal connection portion 32 of the damping shaft 30 is installed into the mounting hole 25 of the disc body 22.

The lower shaft 40 is connected in between with the damping shaft 30 and the external chain-guiding member 10. In detail, the lower shaft 40, mounted into the main axle body 21 of the lower link member 20, includes a mounting section 41, a middle section 42 and an acting section 43. The middle section 42 is located between the mounting section 41 and the acting section 43. The mounting section 41 is fixed into the first pivotal hole 12 of the external chain-guiding member 10, such that the external chain-guiding member 10 can move with the lower shaft 40. The acting section 43 is fixed to the pivotal connection portion 32 of the damping shaft 30, so that the external chain-guiding member 10 can move with the damping shaft 30.

The C-shape spring 50, mounted to one side of the lower link member 20, is to sleeve and thus engage the damping shaft 30. In detail, the C-shape spring 50 includes a C-clip portion 51, a first plate portion 52 and a second plate portion 53. The C-clip portion 51 is formed as a C-shaped annular plate to provide a central empty space 512 having a protrusive opening 514. As shown, the first plate portion 52 and the second plate portion 53 are individually extended outward from two respective ends of the C-clip portion 51 in respective radially directions (i.e., directions to leave the damping shaft 30). The protrusive opening 514 of the C-clip portion 51 is defined by the first plate portion 52 and the second plate portion 53. Thereupon, a size of the protrusive opening 514 is determined by sandwiched spacing generated by the first plate portion 52 and the second plate portion 53. As shown in FIG. 2A, in assembly, the switch shaft 60 is located in the protrusive opening 514, with the first plate portion 52 to be confined in a gap formed between the switch shaft 60 and the position-limiting structure 23 and the second plate portion 53 located to an opposing side of the switch shaft 60 with respect to the gap.

On the other hand, in assembly, the damping shaft 30 is located in the central empty space 512 of the C-clip portion 51, without contacting the switch shaft 60 directly. A first tense relationship S1 is defined as a state that the C-clip portion 51 clamps tightly the shaft body 31 of the damping shaft 30. In the first tense relationship S1, substantial friction-ability would exist between the shaft body 31 of the damping shaft 30 and the C-clip portion 51. Thus, while in the first tense relationship S1, as the external chain-guiding member 10 rotates and thereby co-moves the damping shaft 30, rotational friction forcing would be induced between the damping shaft 30 and the C-clip portion 51 so as to provide resistance against movement between the damping shaft 30 and the C-clip portion 51.

Upon such an arrangement, as shown in FIG. 2A and FIG. 1, while the external chain-guiding member 10 rotates about the lower link member 20 in a direction D1 to relax the chain, the damping shaft 30 synchronously moved with the external chain-guiding member 10 would drive the C-clip portion 51 of the C-shape spring 50 to rotate, and so do the first plate portion 52 and the second plate portion 53. Since the first plate portion 52 is disposed between a connection member 62 of the switch shaft 60 and the position-limiting structure 23 of the lower link member 20, thus movement of the first plate portion 52 is restricted by both the connection member 62 of the switch shaft 60 and the position-limiting structure 23 of the lower link member 20, a relative rotation between the damping shaft 30 and the C-shape spring 50 would be generated so as to induce a first friction force F1 in the direction D1 to an inner wall of the C-clip portion 51. Obviously, as shown in FIG. 2A, the first friction force F1 drives the C-clip portion 51 to further clamp tightly the damping shaft 30, so as to enhance further the first tense relationship S1.

Contrarily, while the external chain-guiding member 10 rotates about the lower link member 20 in another direction D2 to tense the chain, the damping shaft 30 synchronously moved with the external chain-guiding member 10 would generate a second friction force F2 in the direction D2 to the inner wall of the C-clip portion 51. The second friction force F2 would drive the C-clip portion 51 to relax the damping shaft 30, so as to lessen the first tense relationship S1.

Generally speaking, in this present invention, the C-shape spring 50 can provide relevant frictions in different directions and scales to the damping shaft 30, such that the first tense relationship S1 can be enhanced or lessened accordingly. Thereupon, while the bicycle meets impacts or shaking upon being ridden on an uneven surface, the external chain-guiding member 10 can be rotated in the direction D1 so as to further relax the chain. Thus, the rotational friction force upon the external chain-guiding member 10 in the direction D1 to relax the chain can be larger than that in the direction D2 to tense the chain, and so the resulted rotational friction forcing upon the external chain-guiding member 10 would be in the direction D1 to relax the chain. Thereby, tension of the chain can be effectively controlled by the external chain-guiding member 10, so that the chain can be substantially away from the slack situation caused by the impacts and/or the shaking.

In this embodiment, the switch shaft 60, pivotally connected with the pivotal shaft 24 of the lower link member 20, is located between the first plate portion 52 and the second plate portion 53. In addition, the first plate portion 52 is located between the switch shaft 60 and the position-limiting structure 23.

Upon such an arrangement, the switch shaft 60 can be purposely turned to provide the C-shape spring 50 an active state T1 with respect to the damping shaft 30 as shown in FIG. 2A, or an inactive state T2 as shown in FIG. 2B. Hence, according to user requirements, the aforesaid controls performed by the external chain-guiding member 10 to either relax or tense the chain can be switched on or off by determining the position state of the switch shaft 60.

In this embodiment, in the case that the C-shape spring 50 is in the active state T1 with respect to the damping shaft 30 as shown in FIG. 2A, the C-clip portion 51 can contact firmly onto the damping shaft 30 due to preset spring forcing so as to obtain the first tense relationship S1, and thus the aforesaid controls performed by the external chain-guiding member 10 to either relax or tense the chain can be switched on. Namely, the rotational friction force upon the external chain-guiding member 10 in the direction D1 to relax the chain can be made larger than that in the direction D2 to tense the chain, and thus the resulted rotational friction forcing upon the external chain-guiding member 10 in the direction D1 can be achieved to relax the chain.

On the other hand, in the case that the C-shape spring 50 is in the inactive state T2 with respect to the damping shaft 30 as shown in FIG. 2B, the C-clip portion 51 would be expanded by the switch shaft 60 so as to contact partly, or even be free of contact with, the damping shaft 30, such that the first tense relationship S1 would be lifted. At this time, the C-shape spring 50 would be unable to provide rotational friction forcing to the damping shaft 30, and thus rotational resistance upon the external chain-guiding member 10 would be almost the same in either direction.

In addition, within the aspect of the inactive state T2, a second tense relationship can be defined to a state that the C-clip portion 51 of the C-shape spring 50 contacts partly or slightly the damping shaft 30. Namely, in the second tense relationship, the damping shaft 30 is slightly restrained by the C-clip portion 51 of the C-shape spring 50, so that only slight rotational friction forcing can be provided to the external chain-guiding member 10. Namely, the rotational friction force upon the external chain-guiding member 10 in the direction D1 to relax the chain can be slightly larger than that in the direction D2 to tense the chain, and so the resulted rotational friction forcing upon the external chain-guiding member 10 would be in the direction D1 to relax the chain slightly. Thereby, tension of the chain can be somehow regulated by the direction of rotation of the external chain-guiding member 10.

As shown in FIG. 1, the switch shaft 60 includes an input end 61, a connection portion 62 and an output end 63, in which the connection portion 62 is connected in between with the input end 61 and the output end 63. The output end 63 includes at least one flange 631 (two in the embodiment as shown). In FIG. 1, the two flanges 631 of the output end 63 are spaced by a predetermined distance.

In this embodiment, in the case that both the flanges 631 are free of contact from any of the first plate portion 52 and the second plate portion 53, the first plate portion 52 is kept away from the second plate portion 53 by original preset spacing, and both the first plate portion 52 and the second plate portion 53 would be rigidly moved with the C-clip portion 51. In this situation, the C-clip portion 51 is at a position to contact the damping shaft 30. Namely, the C-shape spring 50 is in the active state T1 with respect to the damping shaft 30, as shown in FIG. 2A.

On the other hand, in the case that both the flanges 631 contact the respective first plate portion 52 and second plate portion 53, the first plate portion 52 and the second plate portion 53 are kept further away and thus expand the C-clip portion 51. As the C-shape spring 50 is expanded, contact between the C-clip portion 51 and the damping shaft 30 is reduced, so that the damping shaft 30 can be a free state that the C-clip portion 51 would be free from, or at least less contact with, the damping shaft 30. Namely, the inactive state T2 of the C-shape spring 50 with respect to the damping shaft 30, as shown in FIG. 2B, can be obtained. In particular, as mentioned above, if the C-clip portion 51 is in the second tense relationship top partly or slightly contact the damping shaft 30, the damping shaft 30 is not active completely, and thus the external chain-guiding member 10 can still present provide slack and tense rotational operations in two different directions of rotation.

Refer now to FIG. 3A through FIG. 3C. In this embodiment, as shown in FIG. 3B, through turning the input end 61, the switch shaft 60 can rotate about the lower link member 20 in a direction of rotation R1 (either toward or away from the position-limiting structure 23), such that the C-shape spring 50, with respect to the damping shaft 30, can be switched between the active state T1 as shown in FIG. 3A and the inactive state T2 as shown in FIG. 3C. It shall be explained that this embodiment does not limit the means to rotate the input end 61.

Figure 4:
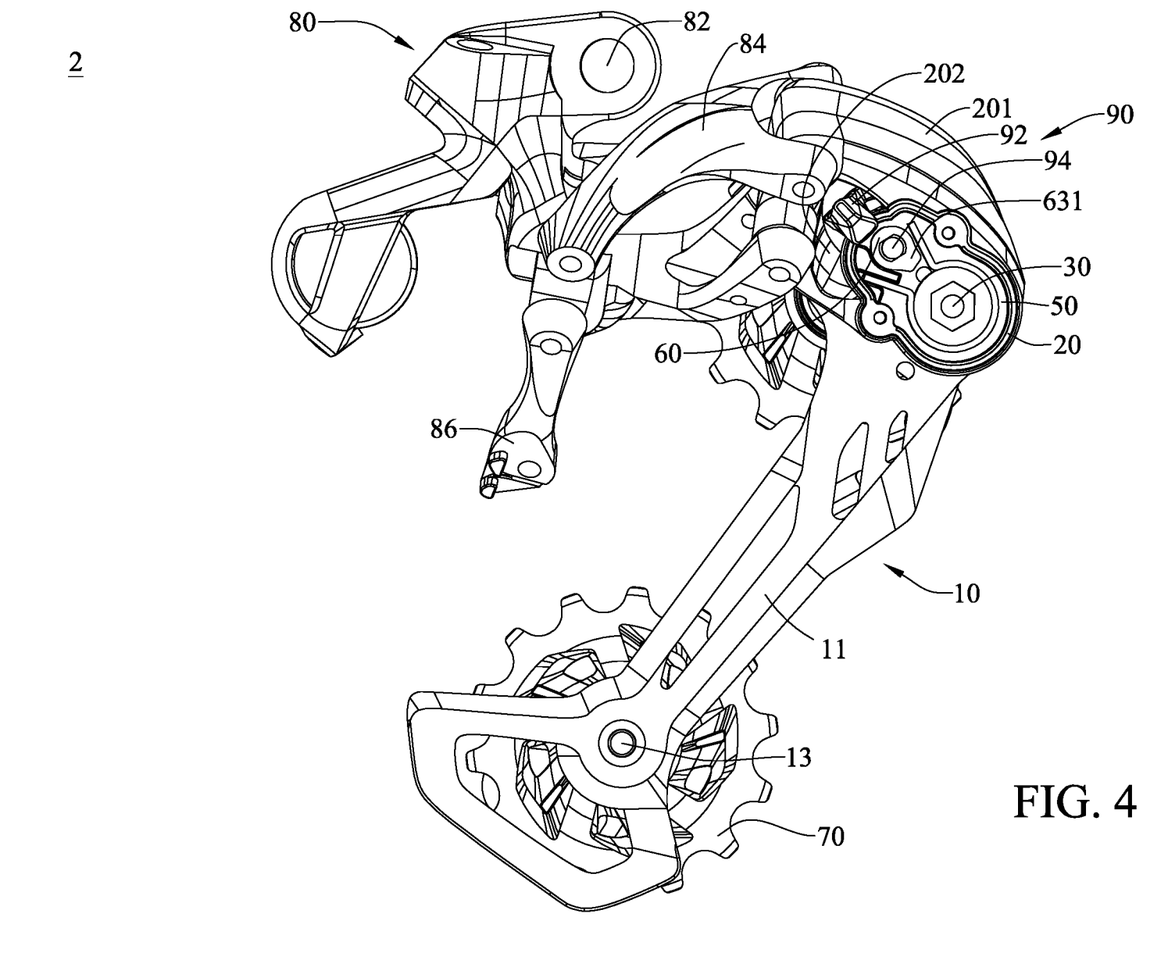
FIG. 4 demonstrates schematically an application of the bicycle derailleur in accordance with the present invention.
Figure 5:
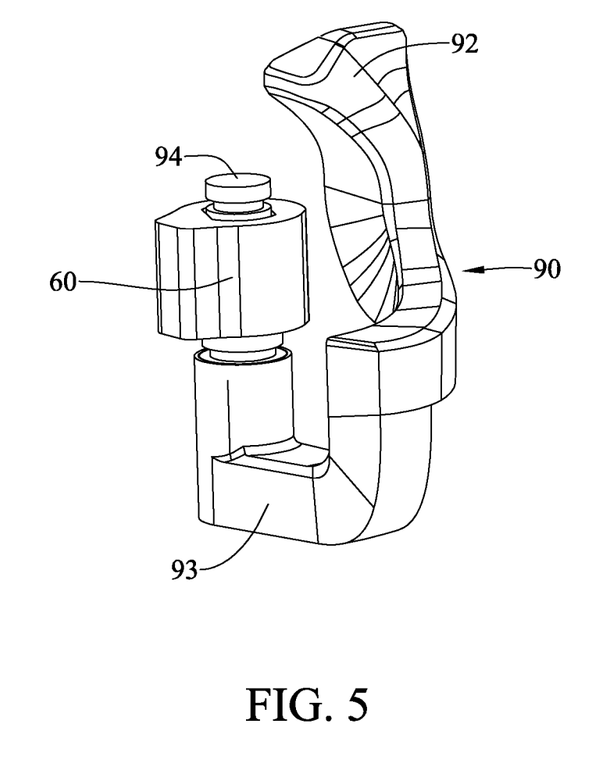
FIG. 5 shows a schematically a connection state of the switch shaft and the switch-shaft control member of FIG. 4.
Figure 6A:
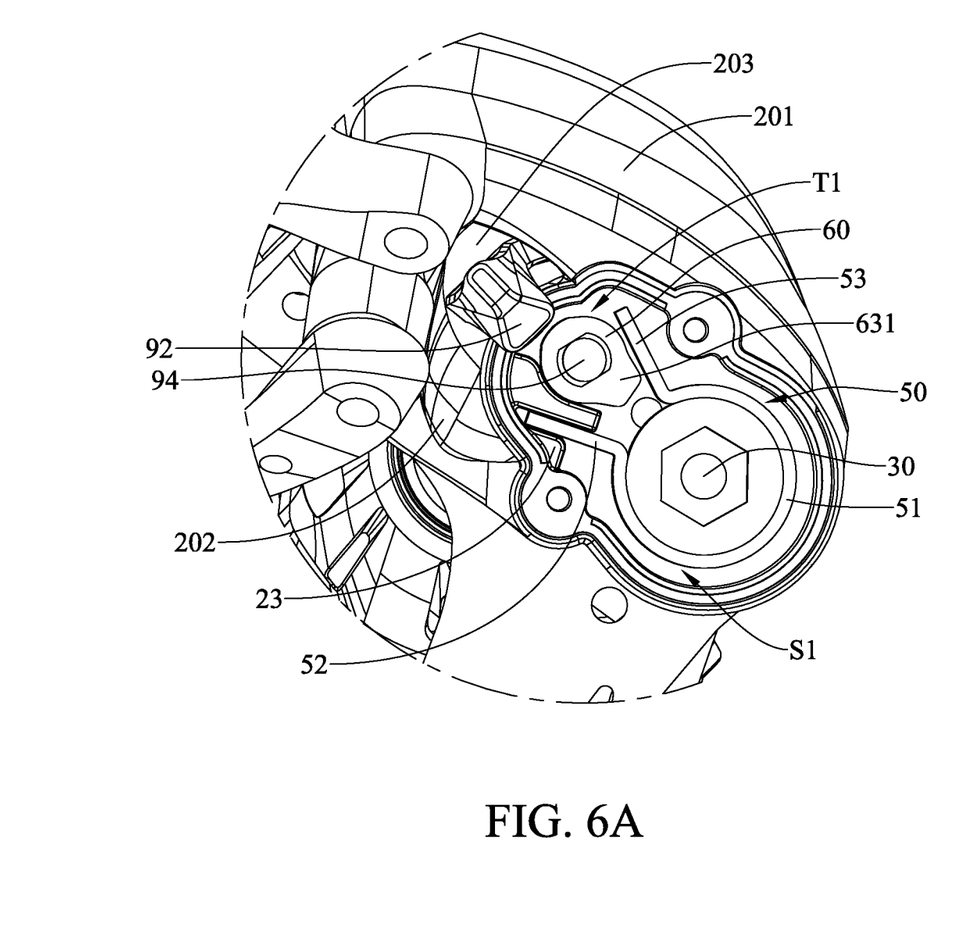
FIG. 6A shows schematically an active state of the bicycle derailleur of FIG. 4.
Figure 6B:
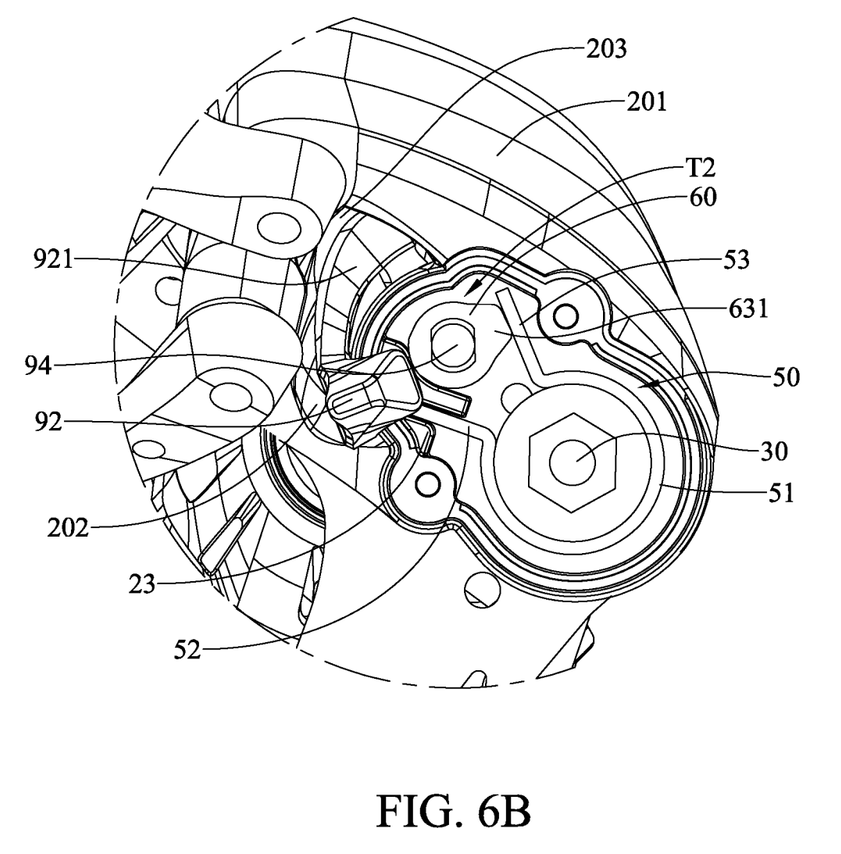
FIG. 6B shows schematically an inactive state of the bicycle derailleur of FIG. 4.
Figure 6C:
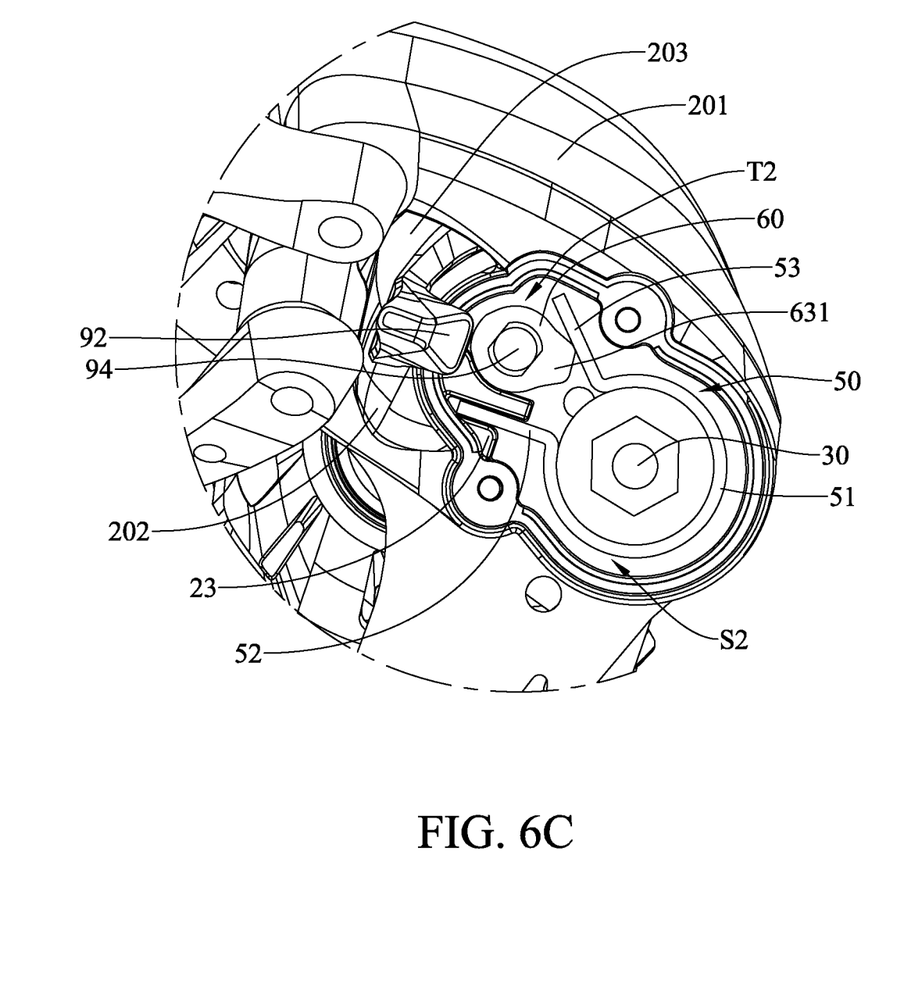
FIG. 6C shows schematically a slight-touch state of the bicycle derailleur of FIG. 4.

Referring now to FIG. 4 through FIG. 6C; where FIG. 4 demonstrates schematically an application of the bicycle derailleur in accordance with the present invention, FIG. 5 shows a schematically a connection state of the switch shaft and the switch-shaft control member of FIG. 4, FIG. 6A shows schematically an active state of the bicycle derailleur of FIG. 4, FIG. 6B shows schematically an inactive state of the bicycle derailleur of FIG. 4, and FIG. 6C shows schematically a slight-touch state of the bicycle derailleur of FIG. 4.

Referring now to FIG. 4 and FIG. 5, in this embodiment, the bicycle derailleur 2 includes an external chain-guiding member 10, a lower link member 20, a damping shaft 30, a lower shaft 40 (see FIG. 1), a C-shape spring 50, a switch shaft 60, a lower guide sprocket 70, a linkage assembly 80 and a switch-shaft control member 90.

In this embodiment, the external chain-guiding member 10 mounts pivotally the lower guide sprocket 70 via a second pivotal hole 13 of the external chain-guiding member 10. The lower guide sprocket 70 is to load and drive the chain of the bicycle. The external chain-guiding member 10, connected with lower link member 20, is to control tension of the chain, and has a rotational direction to tense the chain D2 and another rotational to relax the chain D1 opposing the rotational direction D2, as shown in FIG. 2A.

The linkage assembly 80, connected with the lower link member 20, includes an upper link bar 82, a right link bar 84 and a left link bar 86. One end of the right link bar 84 is connected pivotally with the upper link bar 82, while another end thereof is connected pivotally to a first connection portion 201 of the lower link member 20. A second connection portion 202 of the lower link member 20 is connected pivotally to the left link bar 86.

It shall be explained that the arrangement of the external chain-guiding member 10, the lower link member 20, the damping shaft 30, the lower shaft 40 and the C-shape spring 50 can be referred to the aforesaid descriptions upon FIG. 1 through FIG. 3C, and thus details thereabout are omitted herein. In addition, the switch shaft 60 of FIG. 4 is slightly different to that in any of FIG. 1 to FIG. 3C, and a major difference in between is that the switch shaft 60 of this embodiment is structured as a cam having a portion of contour to mimic the aforesaid flange 631.

In this embodiment, the switch-shaft control member 90, connected pivotally with the switch shaft 60, includes a control bar 92, an extension arm 93 and a control end 94. The control bar 92, structured preferably as a bent and twisted bar, connects the extension arm 93. The extension arm 93, a U-shape body, extends further to connect the control end 94. Thereupon, the control bar 92 can move directly the control end 94, with one free end of the control end 94 to penetrate through the switch shaft 60 and another free end of the control bar 92 to locate closely out of a protrusive tapered opening 203 of the lower link member 20. The control bar 92 is handled to rotate the control end 94 as well as the switch shaft 60.

Upon such an arrangement, as shown in FIG. 6A, in the case that both the first plate portion 52 and the second plate portion 53 do not contact the flange 631 of the switch shaft 60, the first plate portion 52 is restrained by the position-limiting structure 23, the second plate portion 53 kept separately from the first plate portion 52 by originally preset spacing is co-moved with the C-clip portion 51, and so the C-clip portion 51 can better contacts at a periphery of the damping shaft 30, such that the C-shape spring 50 is in the active state T1 with respect to the damping shaft 30 as shown in FIG. 6A. Namely, the C-clip portion 51 integrates the damping shaft 30 to form the first tense relationship S1. As described above, the first tense relationship S1 implies that friction exists between the shaft body 31 of the damping shaft 30 and the C-clip portion 51 of the C-shape spring 50. In addition, by utilizing the C-clip portion 51 to provide respective friction forcing to the damping shaft 30 in different directions, the first tense relationship S1 can be further enhanced or properly reduced. For example, as shown in FIG. 2A, by having the rotational friction force of the external chain-guiding member 10 in the direction D1 to relax the chain to be greater than that in the direction D2 to tense the chain, the rotation of the external chain-guiding member 10 in the direction D1 would present a tenser state, such that the external chain-guiding member 10 can control the tension of the chain effectively so as not to relax the chain. Thereupon, the slack problem of the bicycle caused by impacts and/or shaking can be substantially lessened.

As shown in FIG. 6B, the control bar 92 can be turned to protrude a connection portion 921 of the control bar 92 out of the protrusive tapered opening 203 of the lower link member 20, and simultaneously the control bar 92 co-moves the control end 94 and further moves the switch shaft 60 to rotate as well, such that the flange 631 of the switch shaft 60 can contact and thereby push the second plate portion 53. Referring to FIG. 6B, the flange 631 and the second plate portion 53 are together to form a surface contact so as now to drive the second plate portion 53 away from the first plate portion 52 and also to expand the C-clip portion 51 (i.e., the C-shape spring 50). Thus, the C-clip portion 51 is expanded to shift away from the damping shaft 30. Namely, the first tense relationship S1 is then lifted, since the C-clip portion 51 is free of contact with the damping shaft 30. Hence, the C-shape spring 50 would reach the inactive state T2 with respect to the damping shaft 30, as shown in FIG. 6B. At this time, rotational resistance upon the external chain-guiding member 10 in any arbitrary direction would be largely the same.

As shown in FIG. 6C, in a particular aspect within the inactive state T2 that demonstrates a slight contact, the turning upon the control bar 92 would be minor than that shown in FIG. 6B. Thus, while the switch shaft 60 is rotated by the control end 94, the flange 631 of the switch shaft 60 would form a point contact with the second plate portion 53. At this time, the C-clip portion 51 would be partly or slightly contacted with the damping shaft 30 so as to form a second tense relationship S2. Here, the so-called second tense relationship S2 is an intermediate contact state between those shown in FIG. 6A and FIG. 6B. Under this second tense relationship S2, tightening forcing provided by the C-clip portion 51 would be less than that under the first tense relationship S1. In particular, by having the rotational friction force of the external chain-guiding member 10 in the direction D1 to relax the chain to be slightly greater than that in the direction D2 to tense the chain, the rotation of the external chain-guiding member 10 in the direction D1 would present a slight tenser state, such that the external chain-guiding member 10 can control the tension of the chain effectively so as not to relax the chain. Namely, with this second tense relationship S2, the external chain-guiding member 10 can be still operated to undergo a slack or tense rotation state in the corresponding predetermined direction of rotation.

In summary, in the bicycle derailleur provided by the present invention, the rotational friction force of the external chain-guiding member in the direction to relax the chain can be controlled to be greater than that in the direction to tense the chain, and thus the rotation of the external chain-guiding member in the direction to relax the chain would present a tenser state. Thereupon, the tension of the chain can be controlled to a degree without relaxing the chain. Hence, the chain-slack problem of the bicycle caused by impacts and/or shaking can be substantially lessened.

In addition, the bicycle derailleur of the present invention introduces the switch shaft to provide an option for turning on/off the aforesaid operation of the external chain-guiding member in determining the slack or tense rotation state in the respective direction of rotation.

While the present invention has been particularly shown and described with reference to a preferred embodiment, it will be understood by those skilled in the art that various changes in form and detail may be without departing from the spirit and scope of the present invention.

What is claimed is:
1. A bicycle derailleur, comprising:
a lower link member, including a position-limiting structure;
an external chain-guiding member, connected pivotally with the lower link member, being configured to control a tension of a chain, able to rotate about the lower link member in one of a direction to tense the chain and another direction to relax the chain opposing the direction to tense the chain;
a damping shaft, mounted at one side of the lower link member, connected pivotally with the external chain-guiding member;
a connection member, connected with the lower link member;
a C-shape spring, mounted at the side of the lower link member, sleeving the damping shaft, including a C-clip portion, a first plate portion and a second plate portion, the first plate portion being disposed between the connection member and the position-limiting structure, the C-clip portion contacting the damping shaft to form a first tense relationship, the first plate portion being extended outward from one end of the C-clip portion in a direction leaving the damping shaft, and the second plate portion being extended outward from another end of the C-clip portion in another direction leaving the damping shaft; and
a switch shaft pivotally connected with the lower link member, the switch shaft containing the connection member, the switch shaft being located between the first plate portion and the second plate portion, the switch shaft being turned to define the C-shape spring in an active state and an inactive state with respect to the damping shaft, wherein the switch shaft includes a plurality of flanges;
wherein, when the external chain-guiding member rotates about the lower link member in the direction to relax the chain, the external chain-guiding member rotates the damping shaft to contact the C-clip portion, and the C-clip portion further moves the first plate portion restrained by the connection member and the position-limiting structure, such that a first friction force in the direction to relax the chain is generated between the damping shaft and the C-clip portion, and the first friction force makes the C-clip portion tighten the damping shaft so as to enhance the first tense relationship;
wherein, when the external chain-guiding member rotates about the lower link member in the direction to tense the chain, the external chain-guiding member rotates the damping shaft to contact the C-clip portion such that a second friction force in the direction to tense the chain is generated between the damping shaft and the C-clip portion, and the second friction force relaxes the C-clip portion from the damping shaft so as to weaken the first tense relationship;
wherein the first friction force is greater than the second friction force;
wherein, when the C-shape spring is in the active state, the C-clip portion contacts the damping shaft to form the first tense relationship; wherein, when the C-shape spring is in the inactive state, the C-clip portion does not contact the damping shaft so as to lift the first tense relationship;
wherein, when any of the plurality of flanges does not contact the first plate portion and the second plate portion, the second plate portion kept separately from the first plate portion by originally preset spacing is co-moved with the C-clip portion, and so the C-clip portion moves to contact the damping shaft, such that the C-shape spring is in the active state with respect to the damping shaft wherein, when each of the plurality of flanges contacts respectively the first plate portion and the second plate portion, the second plate portion is kept away from the first plate portion further so as to expand the C-clip portion, and so the C-clip portion moves to be free of contact with the damping shaft, such that the C-shape spring is in the inactive state with respect to the damping shaft.

2. The bicycle derailleur of claim 1, further including a lower shaft connected in between with the damping shaft and the external chain-guiding member.

3. The bicycle derailleur of claim 1, further including a switch-shaft control member connecting the switch shaft.

* * * * *